Oct. 12, 1937.  E. E. MOYER  2,095,827
ELECTRIC VALVE TRANSLATING SYSTEM
Filed Dec. 7, 1933
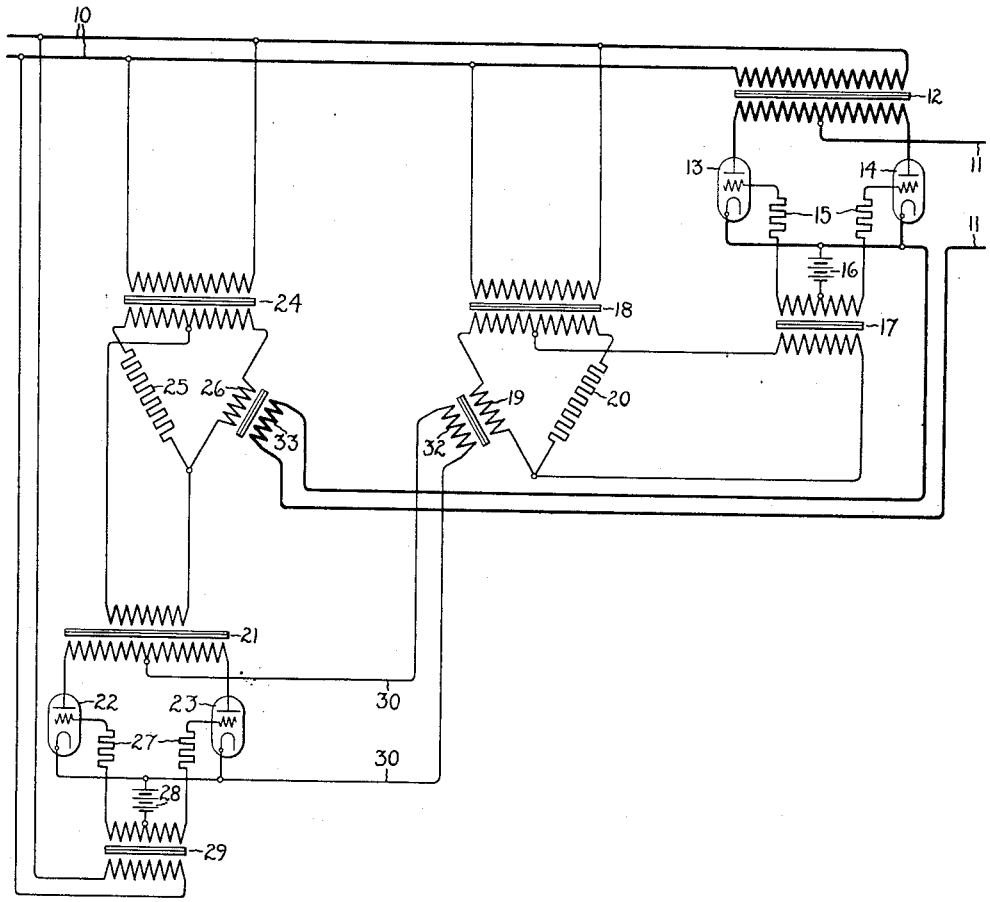
Inventor:
Elmo E. Moyer,
by Harry E. Dunham
His Attorney.

Patented Oct. 12, 1937

2,095,827

UNITED STATES PATENT OFFICE 2,095,827

ELECTRIC VALVE TRANSLATING SYSTEM

Elmo E. Moyer, Schenectady, N. Y., assignor to General Electric Company, a corporation of New York Application December 7, 1933, Serial No. 701,287

13 Claims. (Cl. 175—363)

My invention relates to electric valve translating systems, and more particularly to the control circuits for the electric valves of such systems.

Heretofore there have been devised numerous electric valve translating systems in which one or more electric valves control or convert the energy transmitted within the system. In these cases the control or the conversion by the electric valves is effected by controlling the potentials impressed upon the control electrodes of the electric valves. It is well known that in such cases the conductivity of the electric valves may be controlled by varying the magnitude or phase relation, or both, of the potentials impressed upon the control electrodes of the valves and this control may be effective manually or automatically in response to variations in an electrical condition of the system. It often occurs, however, that variations in an electrical condition of the system, when applied to the control circuit, have an effect which is opposite that necessary to secure the desired control. As an example of such a system, there may be mentioned a controlled rectifier in which the control electrodes of the electric valves are excited from the alternating current circuit through an impedance phase shifting circuit including a saturable reactor. If it is desired to maintain the current of the rectifier substantially constant, it has been found that the effect of the output current of the rectifier, if applied to the saturating winding of the saturable reactor, produces a controlling effect opposite to that which is necessary to secure the desired control of the electric valve.

It is an object of my invention, therefore, to provide an improved electric valve translating system by means of which the transmission of energy in the system may be controlled by one or more electric valves to maintain any desired electrical condition on the system.

It is another object of my invention to provide an improved electric valve translating system in which one or more electric valves control the transmission of energy in the system and in which there is produced a controlling effect responsive to variations in an electrical condition of the system and a second controlling effect, variable equally and oppositely to the first controlling effect, which may be applied to control the electric valves.

In accordance with one embodiment of my invention, a pair of electric valves are connected in a conventional manner to secure full wave rectification and to interconnect an alternating current supply and a direct current load circuit. There is also provided an auxiliary electric valve rectifier, both the grids and anode circuits of which are energized from the alternating current circuit. Interposed between the alternating current circuit and the anode circuit of the auxiliary rectifier is an impedance phase shifting circuit including a saturable reactor, the saturating winding of which is energized with the output current of the main rectifier. The control electrodes of the main rectifier are also energized from the alternating current circuit through a phase shifting circuit including a saturable reactor. The saturating winding of the saturable reactor of this second phase shifting circuit is energized from the output of the auxiliary rectifier. With such an arrangement, the auxiliary rectifier produces a secondary unidirectional current variable equally and oppositely to the output of the main rectifier and this secondary unidirectional current is effective through the second phase shifting circuit to produce an alternating potential retarded in phase in response to increases in the output current of the main rectifier to maintain the output of the main rectifier substantially constant.

For a better understanding of my invention, together with other and further objects thereof, reference is had to the following description taken in connection with the accompanying drawing, and its scope will be pointed out in the appended claims. The single figure of the drawing diagrammatically illustrates an electric valve translating system embodying my invention for transmitting energy from a single phase alternating current supply circuits to a direct current load circuit.

Referring now more particularly to the drawing, there is shown an electric valve translating system for transmitting energy from a single phase alternating current supply circuit 10 to a direct current load circuit 11. This system includes a transformer 12 and a pair of electric valves 13 and 14 connected therewith in a conventional manner to secure full wave rectification. Electric valves 13 and 14 are each provided with an anode, a cathode and a control electrode, or grid, and may be of any of the several types well known in the art, although I prefer to use valves of the vapor electric discharge type. In order to control the output of the rectifier, the control electrodes, or grids, of the valves 13 and 14 are connected to their common cathode circuit through current limiting resistors 15, a negative bias battery 16 and secondary windings of a control transformer 17. The primary winding of the transformer 17 is energized from the alternating current circuit 10 through a suitable phase shifting arrangement, such as an impedance phase shifting circuit comprising a transformer 18, a saturable reactor 19, and a resistor 20, the primary winding of the transformer 17 being connected between the junction of the reactor 19 and resistor 20 and the electrical midpoint of the secondary winding of the transformer 18, in a well known manner.

There is also provided an auxiliary electric valve rectifier comprising a transformer 21 and a pair of electric valves 22 and 23 connected therewith to secure full wave rectification, the primary winding of the transformer 21 being energized from the alternating current circuit 10 through a suitable phase shifting arrangement, such for example, as an impedance phase shifting circuit comprising a transformer 24, a resistor 25 and a saturable reactor 26 connected similarly to the above described phase shifting circuit. The electrode valves 22 and 23 are preferably also of the three electrode, vapor electric discharge type, their control electrode being connected to their common cathode circuit through current limiting resistors 27, a negative bias battery 28 and a control transformer 29, the primary winding of which is energized from the alternating current circuit 10. The output of the auxiliary rectifier is connected to energize a secondary unidirectional current circuit 30 while this circuit is connected to energize a saturating winding 32 of the saturable reactor 19. The saturable reactor 26 is also provided with a saturating winding 33 which is connected in series with the output of the main rectifier.

The general principles of operation of the main controlled rectifier described above will be well understood by those skilled in the art. In brief, the electric valves 13 and 14 conduct during alternate half cycles of the alternating current supply, the average voltage impressed upon the direct current circuit 11 being dependent upon the portions of the cycles of alternating potential during which the valves are conductive. These conducting periods may be varied in phase with respect to the alternating potential by varying the phase of the alternating potential impressed upon their control electrodes by means of the control transformer 17 and the impedance phase shifting circuit 18—19—20. This control of the phase of the potentials impressed upon the control electrodes of the valves 13 and 14 is effected by means of the auxiliary rectifier circuit, the input of which is obtained from the alternating current circuit 10 through the impedance phase shifting circuit 24—25—26.

Assume, for example, that the system has been operating under normal conditions and that the current on the direct current circuit 11 tends to increase due to an increase in load, or other cause. An increase in current in the circuit 11 will increase the saturating effect of the winding 33 on the reactor 26 and as this reactor becomes more saturated the potential impressed upon the primary winding of the transformer 21 becomes advanced in phase. Advancing the phase of the anode potentials of the electric valves 22 and 23 in this manner, is equivalent to retarding the phase of their grid or control electrode potentials, as is well understood by those skilled in the art, the result of which is to decrease the average energization of the secondary unidirectional current circuit 30. As the voltage of the direct current circuit 30 is decreased, the saturating effect of the winding 32 on the saturable reactor 19 is correspondingly decreased to retard the phase of the alternating potential output of the impedance phase shifting circuit 18—19—20 impressed upon the primary winding of the control transformer 17. The result of this is that the control potentials impressed upon the control electrodes of the valves 13 and 14 are retarded with respect to their anode potentials to decrease the average energization of the load circuit 11 and thus to maintain the current on the circuit 11 substantially constant.

While I have illustrated as one embodiment of my invention, an arrangement for maintaining substantially constant current in an electric valve translating system, it will be apparent to those skilled in the art that it is equally applicable to the regulation of voltage, power, or other electrical condition of the system.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. An electric valve translating system comprising a source of current, a load circuit, means including an electric valve for controlling the transmission of energy therebetween, means for producing an alternating current electrical quantity variable in accordance with variations of an electrical condition of the system, means for deriving from said electrical quantity a second alternating current electrical quantity variable substantially equally and oppositely to said first electrical quantity, and means for controlling the conductivity of said valve in accordance with said second electrical quantity.

2. An electric valve translating system comprising a source of current, a load circuit, means including an electric valve for controlling the transmission of energy therebetween, said valve being provided with a control electrode, means for producing an alternating potential variable in phase in accordance with variations in an electrical condition of the system, means for deriving from said alternating potential a second alternating potential substantially equally and oppositely variable in phase with respect to said first alternating potential, and means for exciting the control electrode of said valve with said second alternating potential.

3. An electric valve translating system comprising a source of alternating current, a load circuit, means including an electric valve for controlling the transmission of energy therebetween, means for deriving from said source an alternating potential advancing in phase with respect to that of said source with increasing load current, means for deriving from said alternating potential a second alternating potential substantially equally and oppositely variable in phase with respect to said first alternating potential, and means for controlling the conductivity of said valve in accordance with variations in phase of said second alternating potential.

4. An electric valve translating system comprising a source of alternating current, a load circuit, means including a main electric valve for controlling the transmission of energy therebetween, said valve being provided with a control electrode, an auxiliary electric valve provided with anode and control electrode circuits energized from said source, means responsive to an electrical condition of said system for varying the phase relation between the anode and control electrode potentials of said auxiliary electric valve, means for exciting the control electrode of said main valve from said source, and means for varying the phase of the control electrode potential of said main valve in accordance with the anode current of said auxiliary electric valve.

5. An electric valve translating system comprising a source of alternating current, a load circuit, means including a main electric valve for controlling the transmission of energy therebetween, said valve being provided with a control electrode, an auxiliary electric rectifier valve provided with anode and control electrode circuits energized from said source, a phase shifting circuit interposed between said source and said anode circuit and including a saturable reactor provided with a saturating winding, said saturating winding being energized in accordance with the load current of the system, a second phase shifting circuit connected to excite the control electrode of said main valve from said source and including a second saturable reactor, said second saturable reactor being connected to be energized with the output current of said auxiliary rectifier valve.

6. An electric translating circuit comprising a source of alternating potential, a source of unidirectional control current, and means for producing a secondary unidirectional control current variable equally and oppositely to said first control current comprising an electric valve rectifier provided with anode and control electrode circuits energized from said source of alternating potential, and means for relatively retarding the potential impressed upon said control electrode with respect to that impressed upon said anode in response to increases in said control current, the output of said rectifier comprising said secondary current.

7. An electric translating circuit comprising a source of alternating potential, a source of unidirectional control current, and means for producing a secondary unidirectional current variable equally and oppositely to said control current comprising an electric valve rectifier provided with anode and control electrode circuits energized from said source of alternating potential, a phase shifting circuit interposed between said source and said anode circuit and including a saturable reactor provided with a saturating winding connected to be energized from said source of unidirectional current, the output of said rectifier comprising said secondary current.

8. An electric translating circuit comprising a source of alternating potential, a source of unidirectional control current, and means for deriving from said source of alternating potential an alternating potential retarded in phase with respect thereto in response to an increase of said control current comprising means for deriving from said control current a secondary unidirectional current variable equally and oppositely to said control current, and means controlled by said secondary current for deriving from said source of alternating potential an alternating potential retarded in phase in response to a decrease of said secondary current.

9. An electric translating circuit comprising a source of alternating potential, a source of unidirectional control current, and means for deriving from said source of alternating potential an alternating potential retarded in phase with respect thereto in response to increases of said control current comprising means controlled by said unidirectional current for deriving from said source of alternating potential an alternating potential advanced in phase with respect thereto in response to increases of said control current, and means for deriving from said last mentioned alternating potential a second alternating potential equally and oppositely variable in phase.

10. An electric translating circuit comprising a source of alternating potential, a source of unidirectional control current, and means for deriving from said source of alternating potential an alternating potential retarded in phase with respect thereto in response to increases of said control current comprising an electric valve rectifier provided with anode and control electrode circuits energized from said source of alternating potential, a phase shifting circuit interposed between said source and said anode circuit and including a saturable reactor provided with a saturating winding connected to be energized from said source of unidirectional current, and means controlled by the output current of said rectifier for deriving from said source of alternating potential an alternating potential retarded in phase in response to a decrease of said rectifier current.

11. An electric translating circuit comprising a source of alternating potential, a source of unidirectional control current, and means for deriving from said source of alternating potential an alternating potential retarded in phase with respect thereto in response to increases of said control current comprising means controlled by said control current for deriving from said source of alternating potential a secondary unidirectional current variable equally and oppositely to said control current, and a phase shifting circuit energized from said source of alternating potential and including a saturable reactor provided with a saturating winding energized by said secondary unidirectional current.

12. An electric translating circuit comprising a source of alternating potential, a source of unidirectional control current, and means for deriving from said source of alternating potential an alternating potential retarded in phase with respect thereto in response to increases of said control current comprising an electric valve provided with anode and control electrode circuits energized from said source of alternating potential, a phase shifting circuit interposed between said source and said anode circuit and including a saturable reactor provided with a saturating winding energized from said source of control current, and a second phase shifting circuit including a saturable reactor provided with a saturating winding energized from the anode circuit of said electric valve.

13. An electric valve translating system comprising a source of current, a load circuit, means including an electric valve for controlling the transmission of energy therebetween, said valve being provided with a control electrode, a phase shifter operating in response to the variations in an electrical condition of said system to produce an alternating potential, a second phase shifter, means for controlling said second phase shifter from said first phase shifter to produce a potential varying substantially equally and oppositely in phase with respect to said first alternating potential, and means for exciting the control electrode of said valve from said second phase shifter.

ELMO E. MOYER.